(No Model.)
R. FULLER.
COMBINED ELECTRIC MOTOR AND DRIVEN MACHINE.
No. 495,547. Patented Apr. 18, 1893.
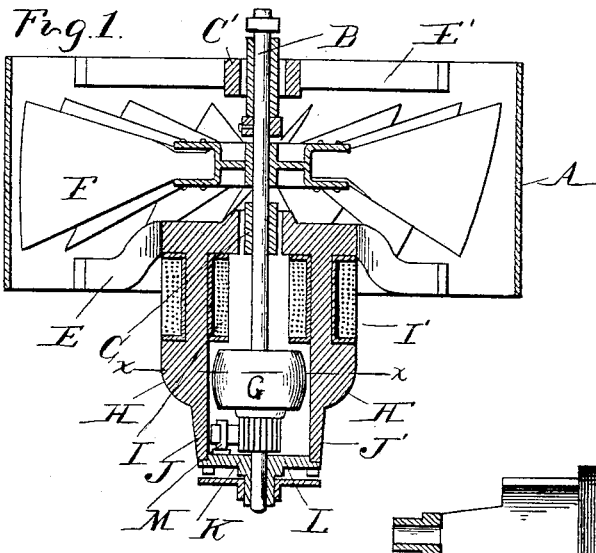
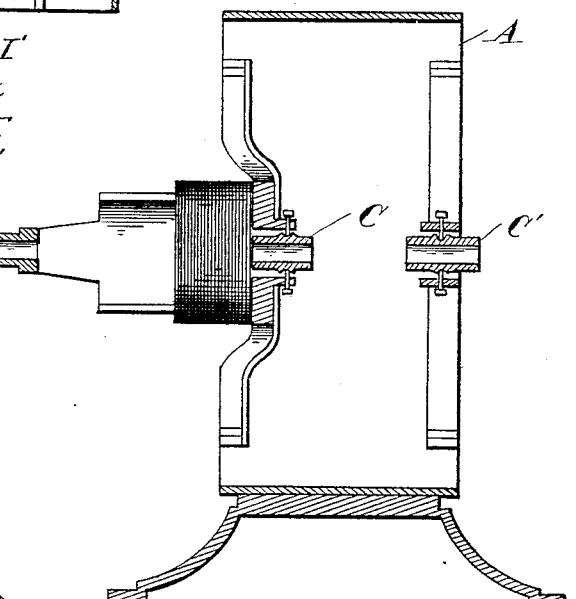
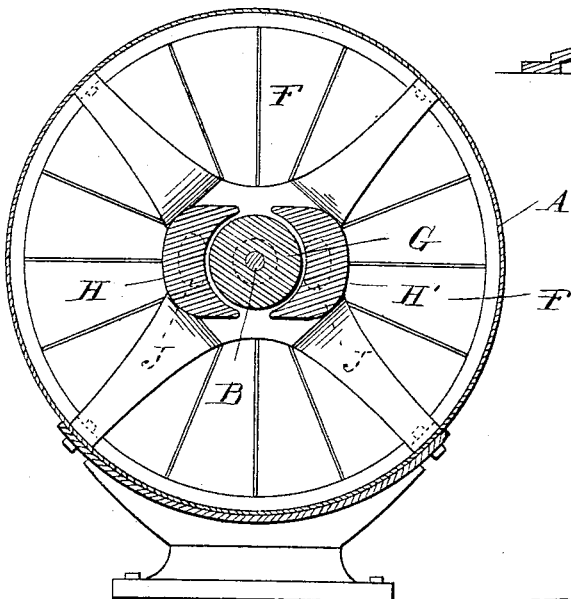
Witnesses
A. L. Hobbie
M. B. Dougherty
Inventor
Rodolphus Fuller
By Mr. L. Sprague & Son
Attys.

UNITED STATES PATENT OFFICE.

RODOLPHUS FULLER, OF DETROIT, MICHIGAN.

COMBINED ELECTRIC MOTOR AND DRIVEN MACHINE.

SPECIFICATION forming part of Letters Patent No. 495,547, dated April 18, 1893.

Application filed March 31, 1892. Serial No. 427,175. (No model.)

*To all whom it may concern:*

Be it known that I, RODOLPHUS FULLER, a citizen of the United States, residing at Detroit, in the county of Wayne and State of Michigan, have invented certain new and useful Improvements in a Combined Electric Motor and Driven Machine, of which the following is a specification, reference being had therein to the accompanying drawings.

My invention consists in the peculiar combination of an electric motor with a driven machine and is designed for transmitting power by electricity to all such machines in which an electric motor may be directly applied to the drive shaft of the machine to be driven, such as with fans, propellers, drills, centrifugal machines, grinding mills, &c.

In the accompanying drawings my invention is illustrated in connection with a rotary fan such as used for ventilating purposes, and Figure 1 shows a horizontal section of a combined motor and fan embodying my invention. Fig. 2 is a vertical cross-section thereof on line $x$—$x$ with the parts in rear thereof shown in elevation. Fig. 3 is a vertical cross-section on the axis of the drive shaft with the shaft and parts attached thereto omitted.

A is the casing of the fan; B is the fan shaft; C C' are the journal boxes of the fan shaft, E E' are the cross trees or spiders secured in the casing and supporting the journal boxes centrally of the casing, and F is the revolving fan wheel, all the parts being of known construction and operation except as more fully hereinafter provided. The fan shaft B extends through the casing on the side on which is the suction and upon this extension is secured the armature G of the electric motor. That part of the frame or spider E through which the shaft B extends to receive the armature is constructively made of solid cast iron in such a manner as to serve as a keeper for two field magnets I I' which are secured in parallel relation to the shaft B and carry at their outer ends the pole heads H H' between which the armature revolves. The pole pieces H H' are preferably rounded off at the outer ends, as shown, and are provided with two projecting arms J J' which may be integrally cast therewith and serve as a means for securing a brass or other non-magnetic cross bar K in which the end bearing of the armature shaft is suitably journaled. The intervening space thus provided between the armature and the cross bar K is occupied by the commutator L and the brush holder M is secured to a collar formed on the cross bar.

In my construction the electric motor becomes a part of the frame of the machine because the frame of the machine also forms the keeper of the magnets and the field magnet cores with the pole heads and their extending arms form in a very simple manner supporting brackets for the outer end of the shaft; the whole arrangement is thereby rendered very simple and compact. My invention however has additional advantages for such classes of machinery in which the operation of the machine produces an end thrust upon its driving shaft, such as in the fan shown in the drawings, in which the resistance of the air produces a thrust on the shaft toward the side of the armature. Now as in the construction of motor described the field preponderates on the side toward the fan, the armature will also produce an end thrust, and this in the construction shown is directly opposed to the thrust produced by the fan, which is thereby diminished or neutralized entirely and thus less friction is produced in the running.

What I claim as my invention is—

1. The combination with the drive shaft of a driven fan, of an armature secured upon a portion of said shaft projecting through the frame of the driven machine, electro-magnets on the suction side of the fan secured to said frame between the fan and armature in parallel relation to said drive shaft, and provided with pole heads at their outer ends between which the armature revolves, and a keeper at the inner ends of said electro-magnets forming a structural part of the frame of the driven machine, substantially as described.

2. The combination with the drive shaft of a driven fan, of an armature secured upon a portion of said shaft extended through the frame of the driven machine, two electro-magnets secured to said frame between the armature and fan in parallel relation to said shaft, pole heads formed on the outer ends of said magnets, arms extending therefrom, a non-magnetic cross-bar uniting such arms and forming a bearing for the drive shaft and a magnetic keeper uniting the inner ends of the electro-magnets and forming a structural part of the frame of the machine to be driven, substantially as described.

3. In a combined motor and fan, the combination with the inclosing iron casing and frames or spiders in which the fan shaft is journaled, of a fan shaft extended through one of said frames on the suction side of the fan and carrying the armature of an electric motor, two electro-magnets secured to said frame parallel with the fan shaft and utilizing said frame as a keeper, polar heads on the outer ends of the electro-magnets forming the magnetic field in which the armature revolves, and two arms extending outwardly from the polar heads and carrying a non-magnetic cross bar in which the end of the fan shaft is journaled, substantially as described.

4. In a combined motor and fan, the combination with a frame, of an electric motor, a shaft, an armature on the shaft, a fan on the shaft, magnets for the motor arranged on the suction side of the fan, and a keeper forming a structural part of the machine, substantially as described.

5. In an electric fan, the combination with a frame, of a shaft journaled therein, a fan on the shaft, and an electric motor having its armature on the shaft and its poles arranged with their predominating fields in the direction of the fan, substantially as described.

In testimony whereof I affix my signature in presence of two witnesses.

RODOLPHUS FULLER.

Witnesses:
N. L. LINDOP,
M. B. O'DOGHERTY.